「US008661929B2」

United States Patent
Choi et al.

(10) Patent No.: US 8,661,929 B2
(45) Date of Patent: Mar. 4, 2014

(54) DEVICE FOR GENERATING STIFFNESS AND METHOD FOR CONTROLLING STIFFNESS AND JOINT OF ROBOT MANIPULATOR COMPRISING THE SAME

(75) Inventors: Jun Ho Choi, Seoul (KR); Sung Chul Kang, Seoul (KR); Woo Sub Lee, Seoul (KR); Mun Sang Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 766 days.

(21) Appl. No.: 12/867,683

(22) PCT Filed: Mar. 17, 2008

(86) PCT No.: PCT/KR2008/001492
§ 371 (c)(1),
(2), (4) Date: Aug. 13, 2010

(87) PCT Pub. No.: WO2009/102088
PCT Pub. Date: Aug. 20, 2009

(65) Prior Publication Data
US 2010/0326227 A1    Dec. 30, 2010

(30) Foreign Application Priority Data
Feb. 14, 2008    (KR) .................. 10-2008-0013537

(51) Int. Cl.
*B25J 17/00*    (2006.01)
*B25J 17/02*    (2006.01)
*B25J 18/00*    (2006.01)

(52) U.S. Cl.
USPC ..................................... 74/490.05

(58) Field of Classification Search
USPC ............. 74/490.01–490.06, 409; 33/520, 644
See application file for complete search history.

(56) References Cited

U.S. PATENT DOCUMENTS

| 4,627,169 | A | * | 12/1986 | Zafred et al. | .................... 33/644 |
| 5,575,597 | A | * | 11/1996 | Bailey et al. | ................... 409/201 |
| 5,836,083 | A | * | 11/1998 | Sangwan | .......................... 33/644 |
| 6,257,957 | B1 | * | 7/2001 | Murray et al. | .................... 451/9 |
| 6,408,531 | B1 | * | 6/2002 | Schimmels | ..................... 33/644 |

(Continued)

OTHER PUBLICATIONS

"The Second Joint Workshop on Dependent Robots in Human Environments" Bulletin, Oct. 7-8, 2002, pp. 88-95, Toulouse, France.

(Continued)

*Primary Examiner* — Troy Chambers
*Assistant Examiner* — Alexander Vu
(74) *Attorney, Agent, or Firm* — Greer, Burns & Crain, Ltd.

(57) ABSTRACT

The present invention relates to a device for generating stiffness and a method for controlling stiffness, which can generate stiffness by using elastic members and can control the stiffness, and a joint of a robot manipulator to which the device and method can be applied. The device for generating stiffness includes a rotating shaft; a plurality of elastic members fixed to the rotating shaft; upper and lower circular plates that are disposed so as to be spaced from each other with the elastic members interposed therebetween, are independently driven with respect to the rotating shaft by power generating units thereof, respectively, and respectively have slits of which the number is equal to the number of the elastic members; and a plurality of moving members that are inserted into the slits formed in the upper and lower circular plates, respectively, and are connected to the elastic members so as to move.

8 Claims, 3 Drawing Sheets

(56) References Cited

U.S. PATENT DOCUMENTS

| | | | |
|---|---|---|---|
| 6,473,985 B2 * | 11/2002 | Won et al. | 33/644 |
| 6,792,689 B2 * | 9/2004 | Joo | 33/644 |
| 7,081,062 B2 * | 7/2006 | Tesar | 475/163 |
| 7,432,634 B2 * | 10/2008 | Choi et al. | 310/323.17 |
| 2005/0184179 A1 * | 8/2005 | Hiraguchi | 242/338.1 |
| 2007/0089557 A1 * | 4/2007 | Solomon et al. | 74/490.01 |
| 2007/0294903 A1 * | 12/2007 | Joo | 33/644 |
| 2010/0326227 A1 * | 12/2010 | Choi et al. | 74/490.05 |

OTHER PUBLICATIONS

"The International Conference on Intelligent Robots and Systems" Bulletin, Aug. 5-9, 1995, pp. 407-412, Los Alamitos, California.

"The International Conference on Robotics and Automation" Bulletin, Apr. 2005, pp. 526-531, Barcelona, Spain.

"The International Conference on Robotics and Automation" Bulletin, May 2002, pp. 1710-1716, Washington, D.C.

* cited by examiner

DEVICE FOR GENERATING STIFFNESS AND METHOD FOR CONTROLLING STIFFNESS AND JOINT OF ROBOT MANIPULATOR COMPRISING THE SAME

TECHNICAL FIELD

The present invention relates to a device for generating stiffness, and more particularly to a device, which can generate and control stiffness using plate springs and a method for controlling the stiffness, and a joint of a robot manipulator comprising the same.

BACKGROUND ART

As for conventional methods for providing stiffness which is applied to a joint for a robot manipulator, there are a method using mechanical springs and a method which detects a force applied to a manipulator without any additional mechanism so as to control driving motors of a joint such that a virtual spring effect is exhibited.

The bulletin of "The Second Joint Workshop on Dependent Robots in Human Environments" [Korea Advanced Institute of Science and Technology, 2002, pp. 88-95] discloses a safe arm structure for robots to which mechanical springs are added. However, the structure cannot control stiffness depending on operations, and is operated with only a predetermined spring constant.

The bulletin of "The International Conference on Intelligent Robots and Systems" (1995, pp. 412-508) discloses a robot arm provided with a mechanical impedance controller. The robot arm disclosed in the literature is constructed so as to control stiffness by using a separate driving device. However, due to the use of the additional driving device, the robot arm cannot rapidly change stiffness.

The bulletin of "The International Conference on Robot and Automation" (2005, pp. 526-531) discloses a variable stiffness driver. The variable stiffness driver disclosed in the literature controls stiffness by using an additional mechanism such as a belt. Therefore, the volume of the variable stiffness driver increases. Further, the belt is associated with the problem of limited endurance.

The bulletin of "The International Conference on Robot and Automation" (2002, pp. 1710-1716) discloses a controller which includes a sensor capable of measuring the force and torque of a joint portion such that a virtual spring effect is exhibited in accordance with the information on the force and torque. However, the controller disclosed in the literature is without a countermeasure against electric breakdown. Further, since controlling is performed by only one controller, efficiency and performance are degraded.

DISCLOSURE

Technical Problem

An advantage of the present invention is that it provides a device for generating stiffness and a method for controlling stiffness, which can generate stiffness by using elastic members and rapidly and easily control stiffness through a simple structure.

Another advantage of the invention is that it provides a joint of a robot manipulator, to which the device for generating stiffness and the method for controlling stiffness are applied in such a manner that variable stiffness can be generated independent of the rotation of a link.

According to an aspect of the invention, a device for generating stiffness comprises a rotating shaft; a plurality of elastic members fixed to the rotating shaft; upper and lower circular plates that are disposed so as to be spaced from each other with the elastic members interposed therebetween, are independently driven with respect to the rotating shaft by power generating units thereof, respectively, and respectively have slits of which the number is equal to the number of the elastic members; and a plurality of moving members that are inserted into the slits formed in the upper and lower circular plates, respectively, and are connected to the elastic members so as to move.

The elastic members may be composed of plate springs which are radially arranged around the rotating shaft.

The slits formed in the upper circular plate may have the same shape as that of the slits formed in the lower circular plate, and the upper and lower circular plates may be disposed symmetrically with each other on the basis of the plate springs. Further, the slits formed in the upper and lower circular plates may be formed in a shape which is curved from the center of the circular plates to the outside, and the curved line may be a circular arc.

Each of the moving members may include a first bearing which is inserted into the slit so as to move along a slit path; and a pair of second bearings which are closely attached to each other with the plate spring interposed therebetween so as to assist the movement of the plate spring.

The power generating units may be driving motors. The device for generating stiffness can control the rotation angles of the respective driving motors in accordance with predetermined functions. Further, the device can control the rotation angle of the rotating shaft and the stiffness by controlling the effective distance from the connection portion between the rotating shaft and the plate spring to the moving member moving along the plate spring.

When the upper and lower circular plates are rotated at the same speed but in reverse directions by controlling the rotation angles of the respective driving motors, the position of the rotating shaft is not changed, but the effective length of the plate spring is changed, depending on the position of the moving member which is moved along the slits of the upper and lower circular plates, so as to change only the stiffness.

When the upper and lower circular plates are rotated at the same speed in the same direction, only the rotating shaft may be rotated without a change in stiffness.

According to another aspect of the invention, a joint for a robot manipulator comprises a link composing the robot manipulator; two driving motors for driving the link; and the device for generating stiffness which connects the link to the driving motors. The rotating shaft of the device for generating stiffness may be connected to the link.

The joint may further include a sensor which is fixed to a frame having the driving motors attached thereto so as to measure the displacement of the rotating shaft.

Advantageous Effects

According to the present invention, since the device for generating stiffness generates stiffness by using the elastic members, that is, the plate springs, the stiffness can be generated by a simple structure. Further, the stiffness can be controlled by controlling the position of the moving members moving along with the plate springs.

Since the controlling of the stiffness can be easily performed by the device for generating stiffness, the stiffness can be reduced in such a manner that the stability of the robot manipulator can be guaranteed in such an environment that a robot comes in contact with the outside. Further, when the robot manipulator needs to be moved at high speed, the stiffness can be increased. Therefore, the device for generating stiffness and the method for controlling stiffness can be applied to a joint for a robot manipulator of a robot which requires stability.

Further, the present invention is not limited just to the robot manipulator, but can be applied to various application fields.

BEST MODE FOR CARRYING OUT THE INVENTION

Figure 1:
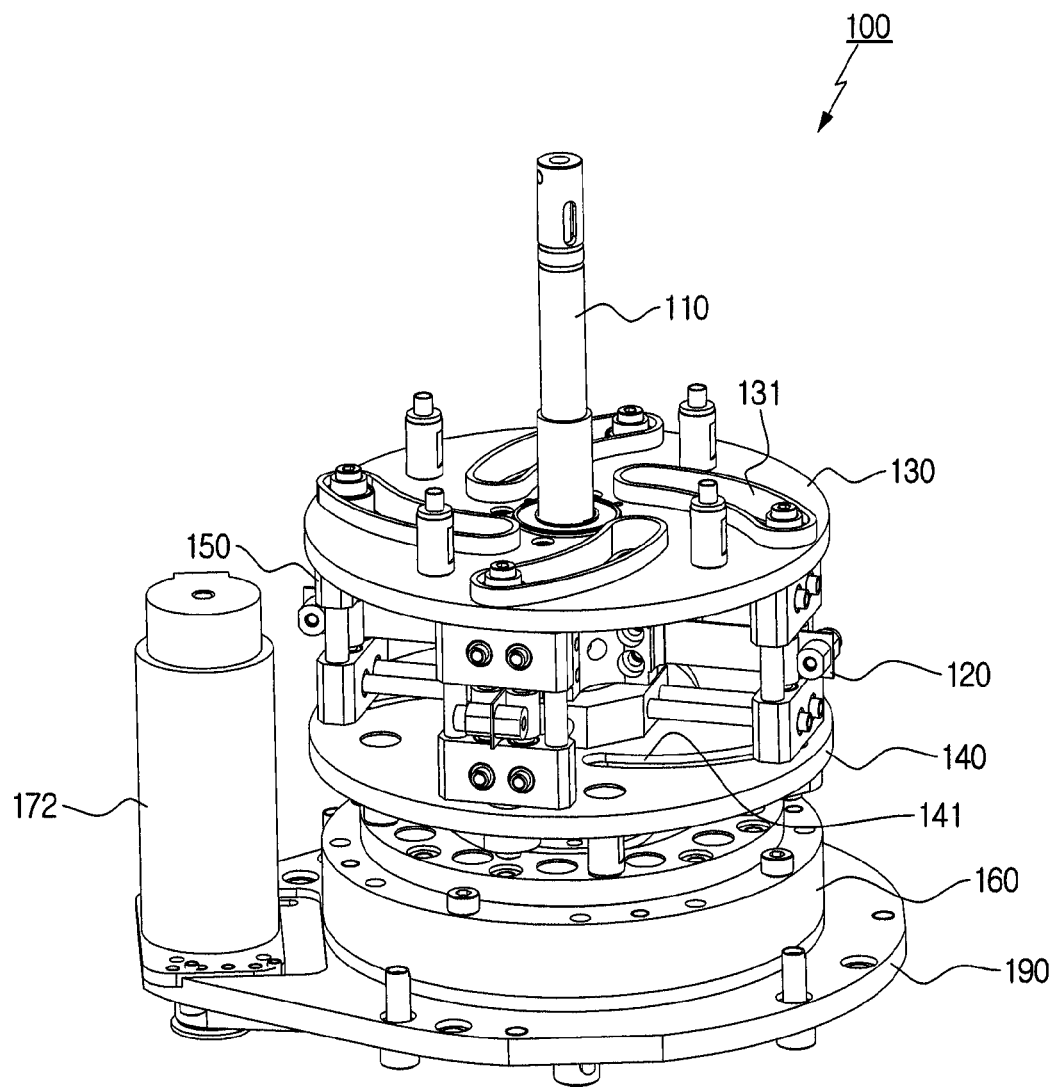
FIG. 1 is a perspective view of a device for generating stiffness according to an embodiment of the invention.

Hereinafter, preferred embodiments of the present invention will be described with reference to the accompanying drawings. Although the invention will be described on the basis of the embodiments shown in the drawings, the embodiments are only examples for the purpose of explanation, and the scope, construction, and operation of the invention are not limited to the embodiments.

Figure 2:
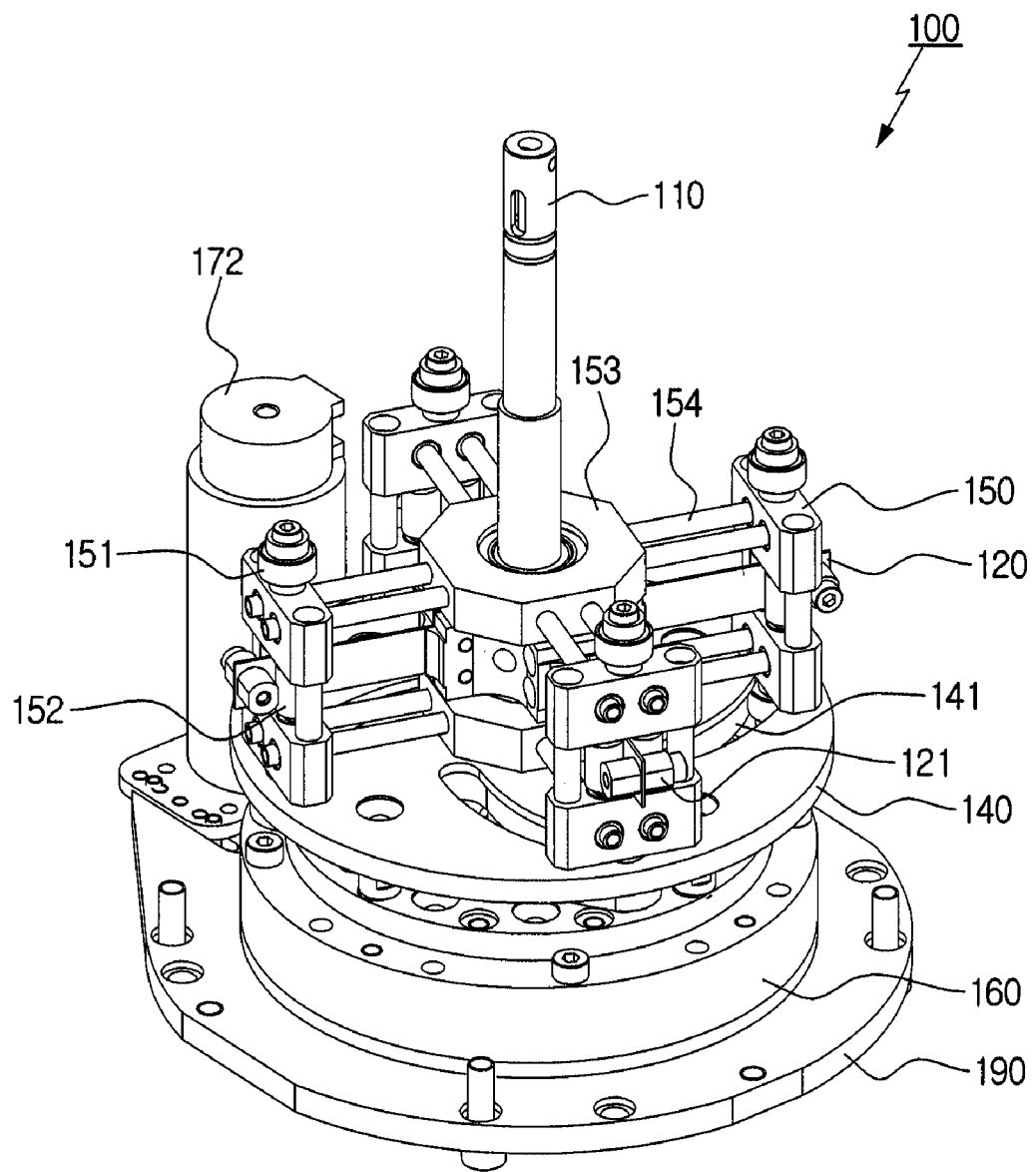
FIG. 2 is a schematic view showing the structure of moving members connected to slits and plate springs, showing a state where an upper circular plate is omitted.

FIG. 1 is a perspective view of a device for generating stiffness according to an embodiment of the invention. FIG. 2 is a schematic view showing the structure of moving members connected to slits and plate springs, showing a state where an upper circular plate is omitted.

Referring to FIGS. 1 and 2, the device 100 for generating stiffness according to the invention includes a rotating shaft 110; a plurality of elastic members fixed to the rotating shaft 110; upper and lower circular plates 130 and 140 which are disposed so as to be spaced from each other with the elastic members interposed therebetween, are independently driven with respect to the rotating shaft 110 by their own power generating units, and respectively have slits 131 and 141 formed therein; and a plurality of moving members 150 which are inserted into the slits 131 and 141 formed in the upper and lower circular plates 130 and 140, respectively, and are connected to the elastic members so as to move. The number of the slits 131 and the number of slits 141 respectively correspond to that of the elastic members.

According to an embodiment of the invention, the elastic members of the device 100 are composed of plate springs 120. The plate springs 120 are radially disposed about the rotating shaft 110. In this embodiment, four plate springs 120 are disposed with even intervals at 90 degrees. However, the number and arrangement of the plate springs 120 may be changed in various manners.

The plate springs 120 are radially disposed about the rotating shaft 110 and are securely attached to the rotating shaft 110. The plate springs 120 are vertically connected in such a manner that stiffness can be generated by the rotation of the upper and lower circular plates 130 and 140.

The upper and lower circular plates 130 and 140 can be driven independently from the rotating shaft 110. Therefore, when the upper and lower circular plates 130 and 140 are rotated by the power generating units, the moving members 150 inserted into the slits 131 and 141 of the upper and lower circular plates are rotated together. Since the moving members 150 are connected to the plate springs 120, the rotating shaft 110 is rotated by the rotation of the plate springs 120. The device 100 for generating stiffness can generate stiffness by using a unique elastic force of the plate springs 120.

Referring to FIG. 2, the moving members 150 are installed so as to move along with the plate springs 120. The device 100 for generating stiffness includes a pair of rotating bodies 153 and a plurality of beam elements 154. The rotating bodies 153 can be rotated independently from the rotating shaft 110 so as to help the moving members 150 to be positioned on the plate springs 120, and are positioned above and below the plate springs 120. The beam elements 154 are connected to the rotating bodies 153 so as to pass through the moving members 150. Further, each of the plate springs 120 has a fixing piece 121 installed therein, the fixing piece 121 preventing the moving member 150 from coming off from the plate spring 120.

The slits 131 formed in the upper circular plate 130 have the same shape as that of the slits 141 formed in the lower circular plate 140. When seen from above, the slits 131 formed in the upper circular plate 130 and the slits 141 formed in the lower circular plate 140 may be disposed symmetrically with each other on the basis of the plate springs 120. That is, the slits 131 formed in the upper circular plate 130 and the slits 141 formed in the lower circular plate 140 are disposed to face each other as if they were reflected on a mirror.

Further, the slits 131 and 141 are formed in a shape which is curved from the center of the circular plates toward the outside. For example, the slits 131 and 141 may be formed in a circular arc shape.

The upper and lower circular plates 130 and 140 are driven independently from each other with respect to the rotating shaft 110 by their own power generating units. The relative position between the upper and lower circular plates 130 and 140 can be changed by the power generating units. When the relative position between the upper and lower circular plates 130 and 140 is changed, the moving members 150 can be moved along the slits 131 and 141 to the inside or outside of the circular plates about the rotating shaft 110.

When it is assumed that the distance from a connection portion between the rotating shaft 110 and the plate spring 120 to the moving member 150 moving along the plate spring 120 is an effective distance L, the elastic force of the plate spring 120 changes depending on the effective distance L, which makes it possible to control stiffness generated from the device 100 for generating stiffness. As the slits 131 and 141 are formed in a shape which is curved from the center of the circular plate to the outside, the moving members 150 can be moved more smoothly along the slits 131 and 141. Further, stiffness can be controlled more accurately through mathematical function calculation.

Each of the moving members 150 includes a first bearing 151 which is inserted into the slits 131 and 141 to help the movement of the moving member 150 along a path, and a pair of second bearings 152 which are attached to the plate spring 120 interposed therebetween so as to assist the movement of the plate spring 120. The first and second bearings 151 and 152 serve to reduce the interference among the moving member 150, the slits 131 and 141, and the plate spring 120 such that they can be driven more smoothly.

The power generating units may be driving motors 171 and 172. The upper and lower circular plates 130 and 140 may be driven by the driving motors 171 and 172, respectively. The driving motors may be directly connected to the circular plates. However, to facilitate the connection, the driving motors 171 and 172 may be connected to the circular plates through a belt. Further, the device 100 for generating stiffness may include a rotating drum 160 (refer to FIGS. 1 and 3) which is connected to the upper and lower circular plates 130 and 140 so as to transmit the rotations of the driving motors 171 and 172 to the upper and lower circular plates 130 and 140, respectively.

The device 100 for generating stiffness according to the embodiment of the invention can control the rotation angles of the driving motors 171 and 172 so as to adjust the effective distance L, thereby controlling stiffness. More specifically, the generated stiffness and the rotation angle of the rotating shaft 110 can be simultaneously controlled by controlling the rotation angles of the driving motors 171 and 172. That is, when it is assumed that a desired change in stiffness and the rotation angle of the rotating shaft 110 are S and P, respectively, and when the rotation angles of the driving motors 171 and 172 are $\theta_1$ and $\theta_2$, respectively, the rotation angle P of the rotating shaft 110 is calculated by the following equation.

$$P = \frac{\theta_1 + \theta_2}{2}$$

The generated stiffness can be calculated from the effective length L of the plate spring 120 connected to the rotating shaft 110. The stiffness generated from the plate spring 120 is calculated by the following equation.

$$S = C\frac{ht^3}{L}$$

Here, L represents the effective length of the plate spring 120, t represents the thickness of the plate spring 120, h represents the width of the plate spring 120, and C represents a constant which is determined depending on the material of the plate spring 120.

As the moving member 150 is moved, the effective length L changes, so that the stiffness changes. As the relative position between the upper and lower circular plates 130 and 140 is changed, the position of the moving member 150 moving along the slits 131 and 141 is changed. Therefore, the effective length L of the plate spring 120 is expressed by a function of the relative position between the upper and lower circular plates 130 and 140, and the function has an inverse function. These functions can be expressed as follows.

$$L = f\left(\frac{\theta_1 - \theta_2}{2}\right)$$
$$\theta_1 - \theta_2 = 2f^{-1}(L)$$

As the rotation angles of the driving motors 171 and 172 are controlled so as to control the position of the rotating shaft 110, it is possible to control desired stiffness and the position of the rotating shaft.

$$\theta_1 = P + f^{-1}\left(\frac{Cht^3}{S}\right), \theta_2 = P - f^{-1}\left(\frac{Cht^3}{S}\right)$$

When the upper and lower circular plates 130 and 140 are rotated at the same rotation speed but in reverse directions, a relative displacement between the upper and lower circular plates 130 and 140 occurs. The moving member 150 inserted into the slits 131 and 141 is moved in a radial direction along the surface of the slits 131 and 141. Since the slits 131 and 141 of the upper and lower circular plates 130 and 140 are disposed symmetrically with each other, the moving member 150 is not rotated, but is moved only in the radial direction. As the distance between the moving member 150 and the rotating shaft 110 changes, stiffness generated from the plate spring 120 changes, but the rotating shaft 110 is not rotated.

Further, when the upper and lower circular plates 130 and 140 are rotated at the same speed in the same direction such that a relative displacement between the circular plates does not occur, the moving member 150 inserted between the slits 131 and 141 of the upper and lower circular plates 130 and 140 is rotated at the same speed in the same direction, and the plate spring 120 gripped by the moving member 150 is rotated together. Then, the rotating shaft 110 connected to the plate spring 120 is also rotated to transmit power.

Figure 3:
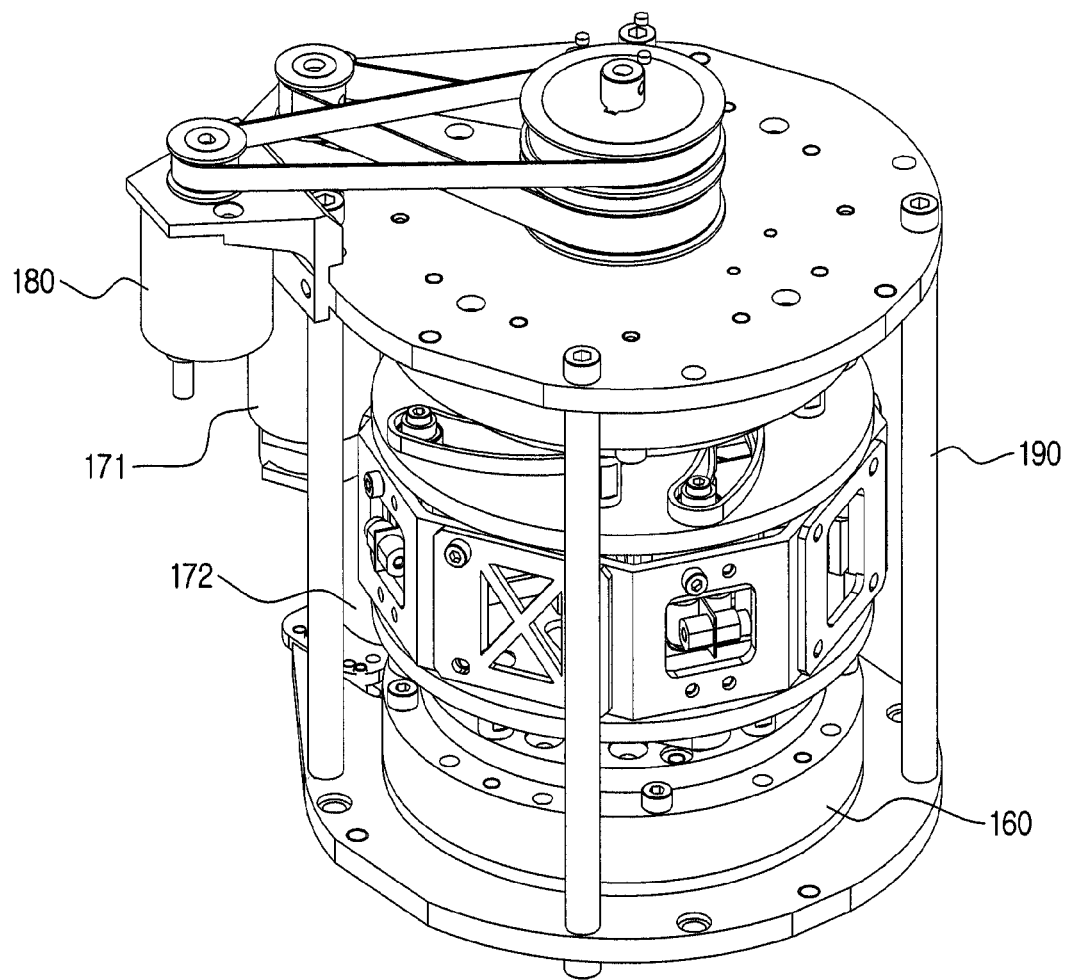
FIG. 3 is a schematic view of a joint for a robot manipulator including the device for generating stiffness according to the invention.

FIG. 3 is a schematic view of a joint for a robot manipulator including the device for generating stiffness according to the present invention.

Referring to FIG. 3, the joint for a robot manipulator according to the invention includes a link (not shown) constructing a robot manipulator; two driving motors 171 and 172 for driving the link; and the device 100 for generating stiffness which connects the link to the driving motors 171 and 172. The driving motors 171 and 172 drive the upper and lower circular plates 130 and 140 of the device 100 for generating stiffness, and the rotating shaft 110 of the device 100 is connected to the link.

That is, the driving motors which can drive the upper and lower circular plates 130 and 140 are included in the joint of the robot manipulator. Further, the device 100 for generating stiffness generates or controls stiffness by using the driving motors, and the link can be driven through the rotating shaft 110.

The joint of the robot manipulator is fixed to a frame 190 having the driving motors 171 and 172 attached thereto and may include a sensor 180 which is connected to the rotating shaft 110 so as to measure a rotational displacement of the rotating shaft 110. Further, information on the displacement of the rotating shaft 110 is fed back by the sensor 180, which makes it possible to control the generated stiffness.

INDUSTRIAL APPLICABILITY

Robot manipulators are used in extreme environments such as the inside of a nuclear reactor, the space, and the scene of a fire. Further, the robot manipulators may be used in various fields such as medical care, ocean development, and so on. The degree of freedom of a robot manipulator is determined by the number of joints.

The device for generating stiffness and the joint for a robot manipulator according to the present invention can be used in robot manipulators so as to be applied to various industrial fields. Further, since the stiffness control can be performed by a relatively simple method, the device for generating stiffness and the joint for a robot manipulator can be used in a robot manipulator which requires stability.

The invention claimed is:
1. A device for generating stiffness, comprising:
a rotating shaft;
a plurality of elastic members fixed to the rotating shaft;
upper and lower circular plates disposed so as to be spaced from each other with the elastic members interposed therebetween, wherein the upper and lower circular plates are independently driven with respect to the rotating shaft by power generating units thereof, respectively, and respectively have slits of which the number is equal to the number of the elastic members; and a plurality of moving members that are inserted into the slits formed in the upper and lower circular plates, respectively, and are connected to the elastic members so as to move, wherein the elastic members are composed of plate springs which are radially arranged around the rotating shaft, wherein the slits formed in the upper circular plate have the same shape as that of the slits formed in the lower circular plate, and the upper and lower circular plates are disposed symmetrically with each other on the basis of the plate springs, wherein the slits formed in the upper and lower circular plates are formed in a shape which is curved from the center of the circular plates to the outside.

2. The device according to claim 1, wherein the curved line is a circular arc.

3. The device according to claim 1, wherein each of the moving members includes: a first bearing which is inserted into the slit so as to move along a slit path; and a pair of second bearings which are closely attached to each other with the plate spring interposed therebetween so as to assist the movement of the plate spring.

4. The device according to claim 1, wherein the power generating units are driving motors, and when the stiffness of the plate spring is S, the rotation angle of the rotating shaft is P, the rotation angles of the driving motors are $\theta_1$ and $\theta_2$, respectively, the effective length of the plate spring which is determined by a relative angle between the upper and lower circular plates is L, the thickness of the plate spring is t, the width of the plate spring is h, and a constant which is determined depending on the material of the plate spring is C, the following equations are satisfied:

$$P = \frac{\theta_1 + \theta_2}{2}, S = C\frac{ht^3}{L}, L = f\left(\frac{\theta_1 - \theta_2}{2}\right), \text{ and}$$

desirable stiffness and the rotation angle of the rotating shaft can be controlled by respectively controlling the rotation angles of the driving motors as expressed below:

$$\theta_1 = P + f^{-1}\left(\frac{Cht^3}{S}\right), \theta_2 = P - f^{-1}\left(\frac{Cht^3}{S}\right).$$

5. The device according to claim 4, wherein as the upper and lower circular plates are rotated at the same speed but in reverse directions, the rotating shaft is fixed, and the effective length of the plate spring is changed, depending on the position of the moving member which is moved along the slits of the upper and lower circular plates, so as to change only the stiffness.

6. The device according to claim 4, wherein as the upper and lower circular plates are rotated at the same speed in the same direction, the effective length of the plate spring is fixed, and only the rotating shaft is rotated.

7. A joint for a robot manipulator, comprising:
a link composing the robot manipulator; and
the device for generating stiffness according to claim 1,
wherein the rotating shaft of the device for generating stiffness is connected to the link so that the link is driven through the rotating shaft.

8. The joint according to claim 7, further comprising:
a frame to which the power generating units are attached,
a sensor which is fixed to the frame for measuring the displacement of the rotating shaft.

* * * * *